(12) United States Patent
Meier et al.

(10) Patent No.: US 11,186,255 B2
(45) Date of Patent: *Nov. 30, 2021

(54) SYSTEM FOR KEYLESS ACTIVATION, ENGAGEMENT, AND MONITORING OF VEHICLES

(71) Applicant: ELECTRONIXIQ INC., Avondale Estates, GA (US)

(72) Inventors: Florian Meier, Tyrone, GA (US); Stephen Vick, Gainesville, GA (US)

(73) Assignee: Electronixiq Inc., Avondale Estates, GA (US)

( * ) Notice: Subject to any disclaimer, the term of this patent is extended or adjusted under 35 U.S.C. 154(b) by 185 days.

This patent is subject to a terminal disclaimer.

(21) Appl. No.: 16/536,594

(22) Filed: Aug. 9, 2019

(65) Prior Publication Data

US 2019/0359174 A1   Nov. 28, 2019

Related U.S. Application Data

(63) Continuation of application No. 15/807,526, filed on Nov. 8, 2017, now Pat. No. 10,377,344.

(Continued)

(51) Int. Cl.
| | |
|---|---|
| *B60R 25/33* | (2013.01) |
| *H04W 12/06* | (2021.01) |
| *B60R 25/02* | (2013.01) |
| *B60R 25/24* | (2013.01) |
| *G06F 13/00* | (2006.01) |

(Continued)

(52) U.S. Cl.
CPC ............ *B60R 25/24* (2013.01); *B60R 25/102* (2013.01); *B60R 25/209* (2013.01); *B60R 25/33* (2013.01); *B60R 25/40* (2013.01); *G06F 13/00* (2013.01); *G07C 9/00* (2013.01); *G07C 9/00174* (2013.01); *G07C 9/00571* (2013.01);
(Continued)

(58) Field of Classification Search
CPC ......... B60R 25/24; B60R 25/02; B60R 25/04; H04W 12/06; H04W 4/21; B60L 11/187; B60L 11/1875; H01H 47/001; H04L 63/08; G06F 7/04
See application file for complete search history.

(56) References Cited

U.S. PATENT DOCUMENTS

| | | | | |
|---|---|---|---|---|
| 3,736,438 A | * | 5/1973 | Matty | ................... H01H 47/001 307/130 |
| 7,323,970 B1 | * | 1/2008 | Murray | ................... B60R 25/04 340/426.12 |

(Continued)

*Primary Examiner* — Yuri Kan
(74) *Attorney, Agent, or Firm* — Mathew L. Grell; Richard Piercy; Grell & Watson Patent Attorneys LLC

(57) ABSTRACT

A system for keyless activation, engagement, and monitoring of vehicles and mobile app system and methods of use via the Internet is provided. The system may include a group of devices having a processor and a data store that are connected to a network. Any one of a first, second, and/or third computing devices may be configured to transmit, receive and process at least one vehicle activation command associated with a first vehicle via a close proximity wireless communication. Additionally, a fourth computing device may be configured to electrically communicate with any of the first, second, and/or third computing device so as to control the first, second, and/or third computing device. An associated method is also provided.

20 Claims, 4 Drawing Sheets

Related U.S. Application Data

(60) Provisional application No. 62/418,978, filed on Nov. 8, 2016, provisional application No. 62/458,075, filed on Feb. 13, 2017.

(51) Int. Cl.
  *G07C 9/00* (2020.01)
  *B60R 25/102* (2013.01)
  *B60R 25/20* (2013.01)
  *B60R 25/40* (2013.01)

(52) U.S. Cl.
  CPC ... *B60R 2325/101* (2013.01); *B60R 2325/106* (2013.01); *G07C 2009/00769* (2013.01)

(56) References Cited

U.S. PATENT DOCUMENTS

| | | | | |
|---|---|---|---|---|
| 2001/0056544 | A1* | 12/2001 | Walker | B60R 25/02 |
| | | | | 726/2 |
| 2007/0001804 | A1* | 1/2007 | Lanier | B60R 25/04 |
| | | | | 340/5.54 |
| 2009/0139781 | A1* | 6/2009 | Straubel | B60L 11/1875 |
| | | | | 180/65.1 |
| 2011/0080258 | A1* | 4/2011 | Curtis | B60R 25/00 |
| | | | | 340/5.72 |
| 2014/0309870 | A1* | 10/2014 | Ricci | H04W 4/21 |
| | | | | 701/36 |
| 2016/0096508 | A1* | 4/2016 | Oz | H04W 12/06 |
| | | | | 701/36 |
| 2016/0099927 | A1* | 4/2016 | Oz | H04L 63/08 |
| | | | | 726/9 |
| 2016/0288659 | A1* | 10/2016 | Hammoud | B60L 11/187 |

\* cited by examiner

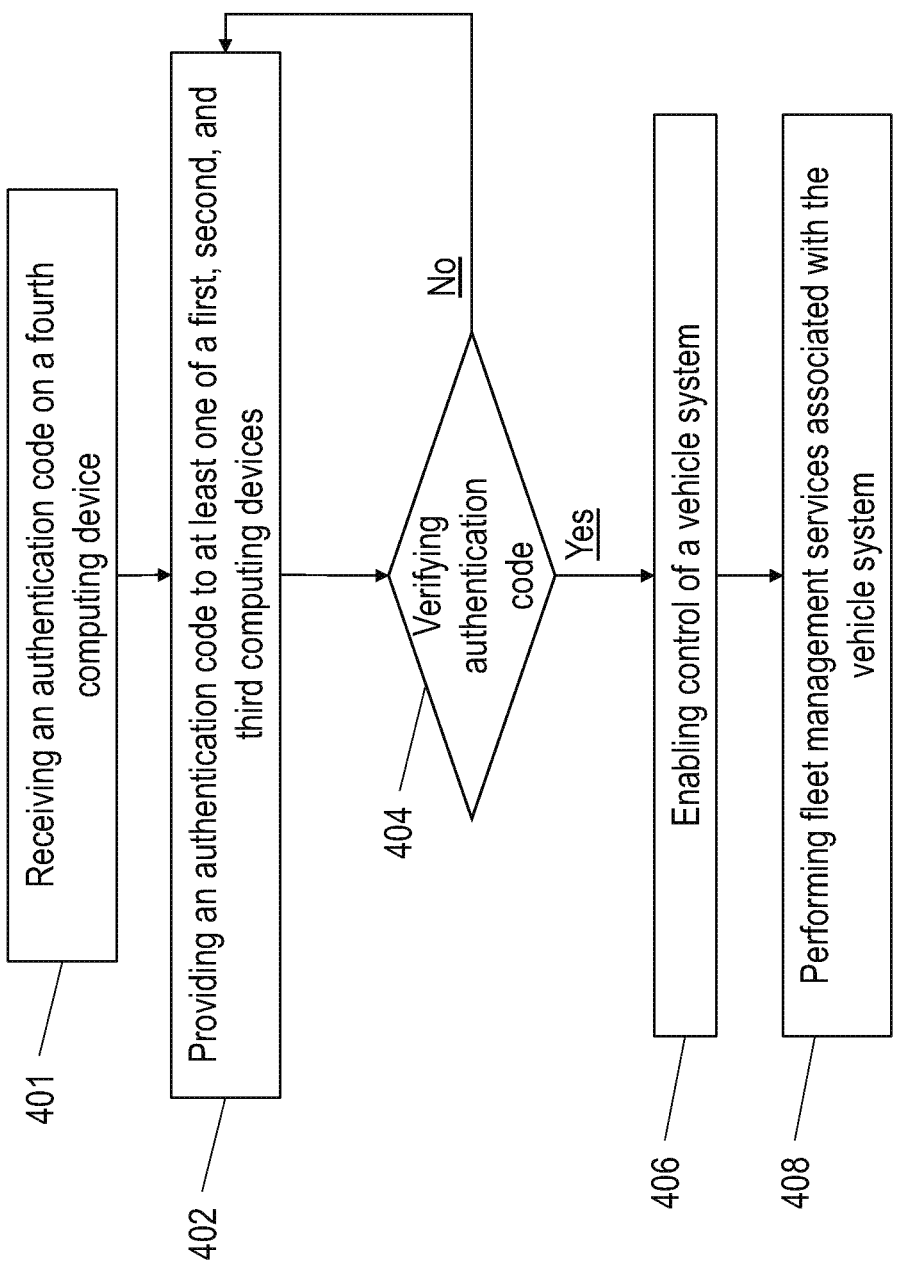

SYSTEM FOR KEYLESS ACTIVATION, ENGAGEMENT, AND MONITORING OF VEHICLES

CROSS-REFERENCE TO RELATED APPLICATIONS

This continuation application claims priority benefit of U.S. Non-Provisional application Ser. No. 15/807,526 filed on Nov. 8, 2017 entitled "System for Keyless Activation, Engagement, and Monitoring of Vehicles" which claims the benefit of priority to U.S. Provisional Ser. No. 62/418,978 filed on Nov. 8, 2016 entitled "Stinger/Qixsys Keyless Security, Activation, Engagement, Battery Monitoring, and Mobile App System and Methods of Use"; and U.S. Provisional Ser. No. 62/458,075 filed on Feb. 13, 2017 entitled "QixStarter (Bluetooth Automotive Switch), QixCell (Bluetooth Enabled Battery) and DropQix (Bluetooth enabled, mobile load control for vehicles)" which are incorporated herein by reference in their entireties.

TECHNOLOGICAL FIELD

The present disclosure relates generally to a system for keyless activation of a vehicle, and remote engagement and monitoring of a vehicle and, in particular, activating the ignition system, controlling electronic components and power systems of the vehicle, and/or monitoring various metrics of the vehicle remotely.

BACKGROUND

Remote vehicle engagement may advantageously provide for efficient vehicle fleet management and/or usage. Past vehicle ignition systems have required direct activation of an automobile engine and/or propulsion device. Unauthorized access to such systems may pose dangers to occupants of the vehicle. Additionally, some vehicle ignition systems provide power to other vehicle systems once the vehicle ignition system is activated. Therefore, it is readily apparent that there is a recognized unmet need for a vehicle engagement system, wherein at least one advantage of such a system may include allowing for vehicle activation without interacting with the vehicle ignition system itself.

BRIEF SUMMARY

Example implementations of the present disclosure are directed to an improved system, method and computer-readable storage medium for locating a workpiece, machine part and/or the like. Example aspects provide a simplified and efficient approach to locating the position of a workpiece during a machining or manufacturing process.

A system for keyless activation, engagement, and monitoring of vehicles and mobile app system and methods of use is provided. The system may include a group of devices having a processor and a data store, said group of devices connected to a network. In some aspects, the system may include a first computing device having a first processor, a first keypad, a first display and a first data store. The first computing device may be configured to receive and process at least one vehicle data associated with a first vehicle via a close proximity wireless communication. The system may further include a second computing device having a second processor, a second keypad, a second display, and a second data store. The second processor may be configured to receive and process an on-off control and activation of the battery systems and transmit a battery status via said close proximity wireless communication. The system may further include a third computing device having a third processor, a third keypad, a third display, and a third data store. The third processor may be configured to receive and process an on-off control and activation of a load control slave module via said close proximity wireless communication. The system may further include a fourth computing device having a fourth processor, a fourth keypad, a fourth display, and a fourth data store. The fourth processor may be configured with an application to transmit an activation and engagement sequence and an on-off control and activation of a battery system via a close proximity wireless communication with any one of the first computing device, the second computing device, and the third computing device. The system may further include a fifth computing device having a fifth processor, a fifth keypad, a fifth display, and a fifth data store. The fifth processor may be configured to receive and communicate an activation and engagement sequence and an on-off control and activation of a battery system with at least the fourth computing device via distant wireless communication protocols and/or the Internet. The system may further include a sixth computing device having a sixth processor, a sixth keypad, a sixth display, and a sixth data store. The sixth processor may be configured to generate and communicate an activation and engagement sequence and/or an on-off control and activation sequence of a battery system with at least one of the fourth computing device and/or fifth computing device via distant wireless communication and/or the Internet.

According to some aspects, the system may further include a first computing device that includes a first display configured to provide a forward indicator and/or a reverse indicator. The system may further be configured to utilize close proximity wireless communication protocols, such as, for example, Bluetooth communication protocols. The system may further include at least one of a first, second, and/or third computing device configured to utilize wireless communication protocols over a wired and/or wireless network. The system may also include at least one first, second, and/or third computing device includes a global positioning system module configured to determine the location of the associated first, second, and/or third computing device. The system may further include at least one of a first, second, and/or third computing device that includes a security alarm. The system may further include at least one of a first, second, and/or third computing device that includes a USB input/output configured to provide for an electrical charge to the associated first, second and/or third computing device. The system may also include a second computing device that includes a battery indicator configured to provide a visual and/or audio indication of the battery status. The system may also include at least one of a first, second, and/or third computing device configured to communicate with another computing device utilizing a wireless mesh network, which may include a plurality of radio nodes (e.g., RF mesh technology). The system may further include a first computing device configured to transmit and/or receive vehicle data associated with the first vehicle, which may include at least one of a keyless activation and engagement sequence, an on-off control command of a vehicle, and an ignition status. The system may further include at least one of a first computing device, a second computing device, and a third computing device is configured to receive an authorization code. Additionally, the system may include at least one of a first computing device, a second computing device, and a third computing device configured to verify the authorization code with at least one of a fourth computing device and/or a sixth computing device. An associated method of operating the vehicle engagement system is also provided.

The features, functions and advantages discussed herein may be achieved independently in various example implementations or may be combined in yet other example implementations further details of which may be seen with reference to the following description and drawings.

BRIEF DESCRIPTION OF THE DRAWINGS

Figure 1:
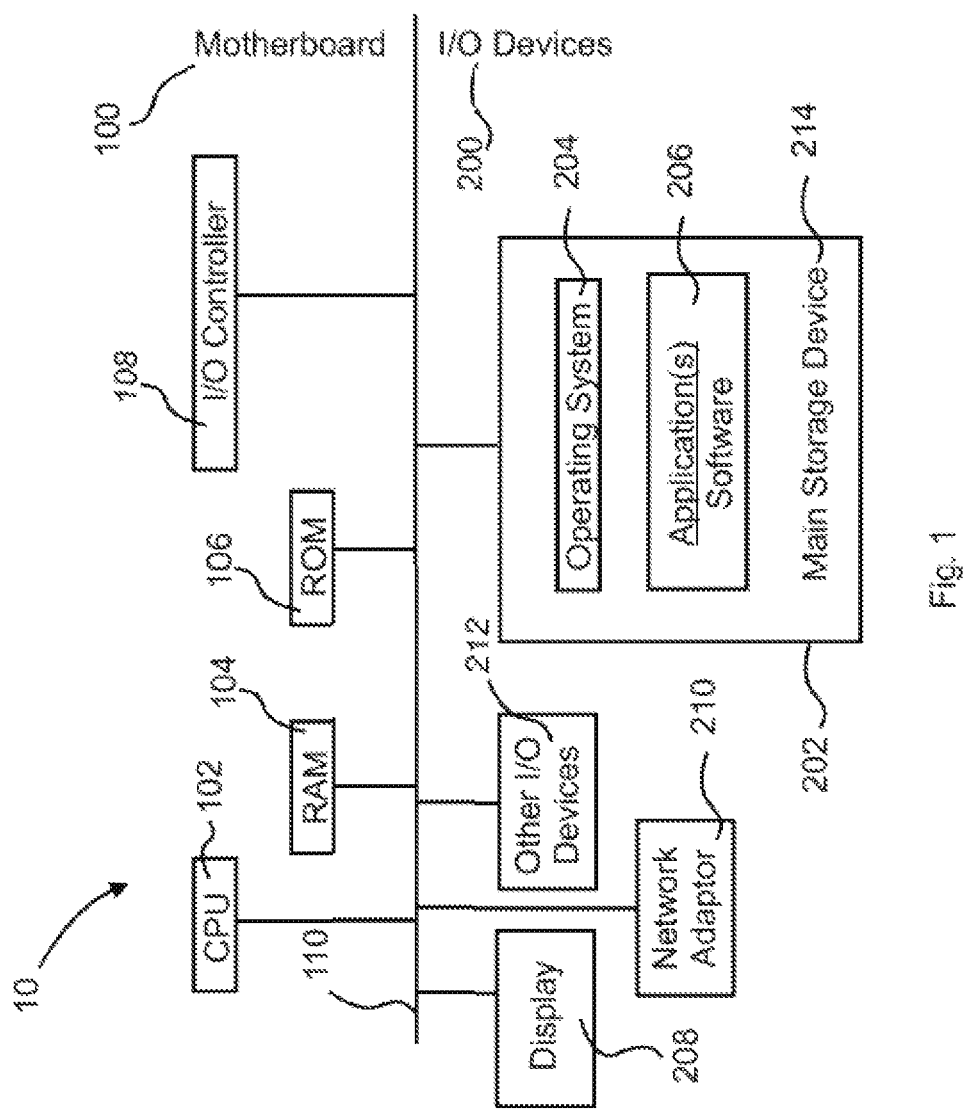
Figure 2:
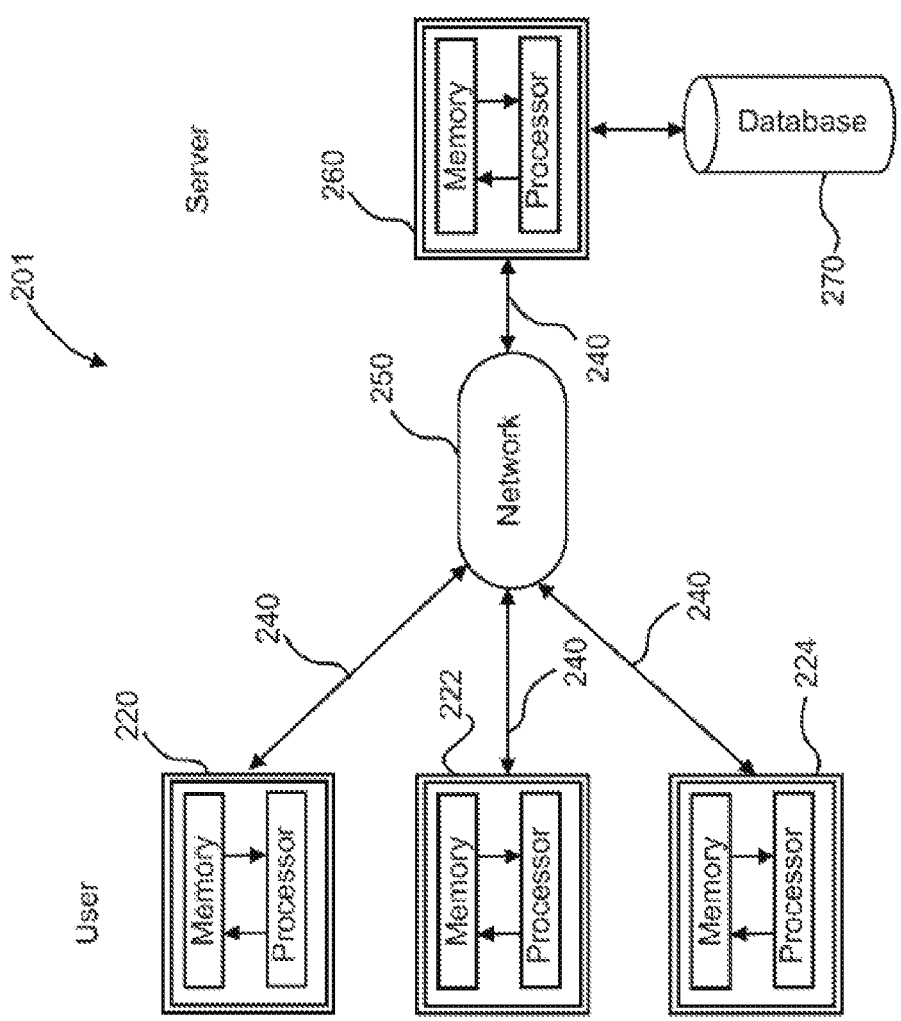
Figure 3:
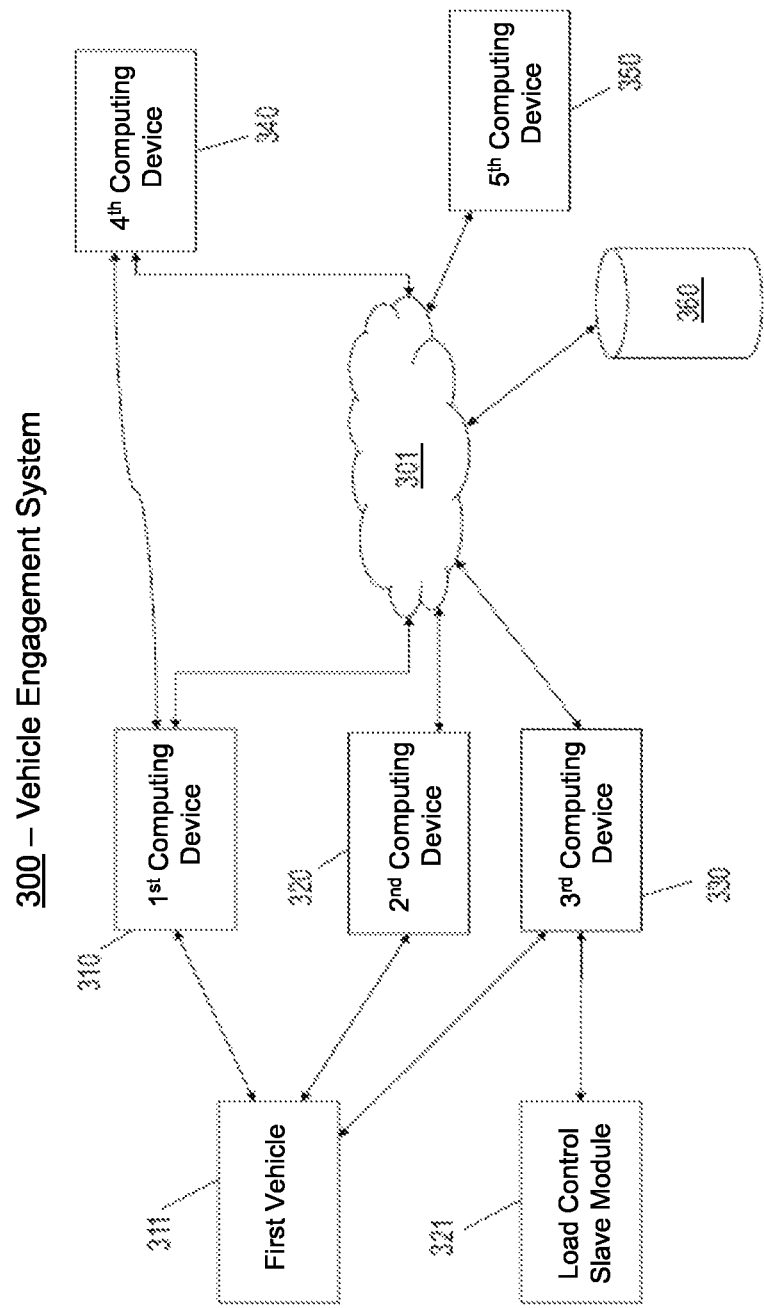

Having thus described example implementations of the disclosure in general terms, reference will now be made to the accompanying drawings, which are not necessarily drawn to scale, and wherein:

FIG. 1 illustrates a schematic block diagram of at least one computing device of a system for engaging, activating, and/or monitoring a vehicle, battery, and/or electrical system of a vehicle having an electrical load according to example aspects of the present disclosure;

FIG. 2 illustrates a schematic block diagram of a system for engaging, activating, and/or monitoring a vehicle, battery, and/or electrical system of a vehicle having an electrical load according to example aspects of the present disclosure;

FIG. 3 illustrates a schematic block diagram of a vehicle engagement system according to one aspect of the present disclosure; and FIG. 4 illustrates a block diagram of a method of engaging a vehicle according to one aspect of the present disclosure.

DETAILED DESCRIPTION

Some aspects of the present disclosure will now be described more fully hereinafter with reference to the accompanying drawings, in which some, but not all aspects of the disclosure are shown. Indeed, various aspects of the disclosure may be expressed in many different forms and should not be construed as limited to the aspects set forth herein; rather, these exemplary aspects are provided so that this disclosure will be thorough and complete, and will fully convey the scope of the disclosure to those skilled in the art. For example, unless otherwise indicated, something being described as being a first, second or the like should not be construed to imply a particular order. Also, something may be described as being above something else (unless otherwise indicated) may instead be below, and vice versa; and similarly, something described as being to the left of something else may instead be to the right, and vice versa. As used in the specification, and in the appended claims, the singular forms "a", "an", "the", include plural referents unless the context clearly dictates otherwise. Like reference numerals refer to like elements throughout.

Aspects of the present disclosure may provide for increased security and efficiency in controlling and/or monitoring vehicle functions, such as, for example, at least one of the control of automotive ignition systems, the control of battery systems within a vehicle, and/or the control of electrical power loads of a vehicle. Some aspects of the present disclosure may provide for a system configured to provide smartphone enabled on-off control of automotive ignition systems. The system may include an electronic switch housed in a plastic enclosure and containing a circuit which may be controlled by a wireless connection, such as a Bluetooth connection, to a smartphone, such as any portable computing device configured to communicate using a Bluetooth connection. Additional aspects of the present disclosure may provide for a system configured to provide smartphone enabled on-off control of a standard lead acid/lithium battery. This system may include an electronic switch integrated into the plastic enclosure of a lead acid battery which may be controlled by Bluetooth wireless connection to a smartphone or other Bluetooth enabled device. Further, aspects of the present disclosure relate to the electronic design of a system which may provide smartphone enabled control of various electrical power loads on vehicles. The system may include a load control panel that is installed on the console. The load control panel may be configured to interact with a load control slave module, which is installed at the actual source of the electrical load itself (e.g. air conditioning, light, fan, heater, etc.). The load control panel may communicate with any of the slave modules by Bluetooth wireless connection of a Bluetooth enabled device.

In describing the exemplary embodiments of the present disclosure, as illustrated in FIGS. 1-2, specific terminology is employed for the sake of clarity. The present disclosure, however, is not intended to be limited to the specific terminology so selected, and it is to be understood that each specific element includes all technical equivalents that operate in a similar manner to accomplish similar functions. The claimed invention may, however, be embodied in many different forms and should not be construed to be limited to the embodiments set forth herein. The examples set forth herein are non-limiting examples, and are merely examples among other possible examples.

As will be appreciated by one of skill in the art, the present disclosure may be embodied as a method, data processing system, or computer program product. Accordingly, the present disclosure may take the form of an entirely hardware embodiment, entirely software embodiment or an embodiment combining software and hardware aspects. Furthermore, the present disclosure may take the form of a computer program product on a computer-readable storage medium having computer-readable program code means embodied in the medium. Any suitable computer readable medium may be utilized, including hard disks, ROM, RAM, CD-ROMs, electrical, optical, magnetic storage devices and the like.

The present disclosure is described below with reference to flowchart illustrations of methods, apparatus (systems) and computer program products according to embodiments of the present disclosure. It will be understood that each block or step of the flowchart illustrations, and combinations of blocks or steps in the flowchart illustrations, can be implemented by computer program instructions or operations. These computer program instructions or operations may be loaded onto a general-purpose computer, special purpose computer, or other programmable data processing apparatus to produce a machine, such that the instructions or operations, which execute on the computer or other programmable data processing apparatus, create means for implementing the functions specified in the flowchart block or blocks/step or steps.

These computer program instructions or operations may also be stored in a computer-usable memory that can direct a computer or other programmable data processing apparatus to function in a particular manner, such that the instructions or operations stored in the computer-usable memory produce an article of manufacture including instruction means which implement the function specified in the flowchart block or blocks/step or steps. The computer program instructions or operations may also be loaded onto a computer or other programmable data processing apparatus (processor) to cause a series of operational steps to be performed on the computer or other programmable apparatus (processor) to produce a computer implemented process such that the instructions or operations which execute on the computer or other programmable apparatus (processor) provide steps for implementing the functions specified in the flowchart block or blocks/step or steps.

Accordingly, blocks or steps of the flowchart illustrations support combinations of means for performing the specified functions, combinations of steps for performing the specified functions, and program instruction means for performing the specified functions. It should also be understood that each block or step of the flowchart illustrations, and combinations of blocks or steps in the flowchart illustrations, can be implemented by special purpose hardware-based computer systems, which perform the specified functions or steps, or combinations of special purpose hardware and computer instructions or operations.

Computer programming for implementing the present disclosure may be written in various programming languages, database languages, and the like. However, it is understood that other source or object oriented programming languages, and other conventional programming language may be utilized without departing from the spirit and intent of the present disclosure.

Referring now to FIG. 1, there is illustrated a block diagram of a computing device 10 that provides a suitable environment for implementing embodiments of the present disclosure. Examples of suitable electronic devices may include any one of a smartphone, tablet computer, laptop computer, desktop computer, workstation computer, server computer and/or the like. The computer architecture shown in FIG. 1 is divided into two parts—motherboard 100 and the input/output (I/O) devices 200. Motherboard 100 preferably includes subsystems and/or processor(s) to execute instructions such as central processing unit (CPU) 102, a memory device, such as random access memory (RAM) 104, input/output (I/O) controller 108, and a memory device such as read-only memory (ROM) 106, also known as firmware, which are interconnected by bus 110. A basic input output system (BIOS) containing the basic routines that help to transfer information between elements within the subsystems of the computer is preferably stored in ROM 106, or operably disposed in RAM 104. Computing system 10 further preferably includes I/O devices 202, such as main storage device 214 for storing operating system 204 and instructions or application program(s) 206, and display 208 for visual output, and other I/O devices 212 as appropriate, such as a keypad, keyboard, touchscreen and/or the like for receiving direct user input. Main storage device 214 preferably is connected to CPU 102 through a main storage controller (represented as 108) connected to bus 110. Network adapter 210 allows the computer system to send and receive data through communication devices or any other network adapter capable of transmitting and receiving data over a communications link that is either a wired, optical, or wireless data pathway. It is recognized herein that central processing unit (CPU) 102 performs instructions, operations or commands stored in ROM 106 or RAM 104.

Processor 102 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 1 as a single processor, in some embodiments, processor 102 comprises a plurality of processors. The plurality of processors may be embodied on a single computing device or may be distributed across a plurality of computing devices collectively configured to function as the computing device 10. The plurality of processors may be in operative communication with each other and may be collectively configured to perform one or more functionalities of the computing device 10 as described herein. In an example embodiment, processor 102 is configured to execute instructions stored in memory 104, 106 or otherwise accessible to processor 102. These instructions, when executed by processor 102, may cause the computing device 10 to perform one or more of the functionalities of the computing device 10 as described herein.

Whether configured by hardware, firmware/software methods, or by a combination thereof, processor 102 may comprise an entity capable of performing operations according to embodiments of the present invention while configured accordingly. Thus, for example, when processor 102 is embodied as an ASIC, FPGA or the like, processor 102 may comprise specifically configured hardware for conducting one or more operations described herein. As another example, when processor 102 is embodied as an executor of instructions, such as may be stored in memory 104, 106, the instructions may specifically configure processor 102 to perform one or more algorithms and operations described herein.

The plurality of memory components 104, 106 may be embodied on a single computing device 10 or distributed across a plurality of computing devices. In various embodiments, memory may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 104, 106 may be configured to store information, data, applications, instructions, or the like for enabling the computing device 10 to carry out various functions in accordance with example embodiments discussed herein. For example, in at least some embodiments, memory 104, 106 is configured to buffer input data for processing by processor 102. Additionally or alternatively, in at least some embodiments, memory 104, 106 may be configured to store program instructions for execution by processor 102. Memory 104, 106 may store information in the form of static and/or dynamic information. This stored information may be stored and/or used by the computing device 10 during the course of performing its functionalities.

Many other devices or subsystems or other I/O devices 212 may be connected in a similar manner, including but not limited to, devices such as microphone, speakers, flash drive, CD-ROM player, DVD player, printer, main storage device 214, such as hard drive, and/or modem each connected via an I/O adapter. Also, although preferred, it is not necessary for all of the devices shown in FIG. 1 to be present to practice the present disclosure, as discussed below. Additionally, the computing device 10 may further include a network adapter 210 configured to transmit and/or receive information, such as to and/or from other apparatus(es), network(s) or the like. The network adapter 210 may be configured to transmit and/or receive information by physical (wired) and/or wireless communications links. Examples of suitable communication interfaces include a network interface controller (NIC), wireless NIC (WNIC) or the like.

Additionally and/or alternatively, the network adapter 210 may be configured to transmit and/or receive information, such as data packets, via a wireless mesh network that includes a plurality of radio nodes, as known to one of skill in the art.

Furthermore, the devices and subsystems may be interconnected in different configurations from that shown in FIG. 1, or may be based on optical or gate arrays, or some combination of these elements that is capable of responding to and executing instructions or operations. The operation of a computer device such as that shown in FIG. 1 is readily known in the art and is not discussed in further detail in this application, so as not to overcomplicate the present discussion.

In some embodiments, some or all of the functionality facilitating activation, engagement, and/or control of a vehicle may be performed by processor 102. In this regard, the example processes and algorithms discussed herein can be performed by at least one processor 102. For example, non-transitory computer readable storage media can be configured to store firmware, one or more application programs, and/or other software, which include instructions and other computer-readable program code portions that can be executed to control processors of the components of system 201 to implement various operations, including the examples shown above. As such, a series of computer-readable program code portions may be embodied in one or more computer program products and can be used, with a computing device, server, and/or other programmable apparatus, to produce the machine-implemented processes discussed herein.

Any such computer program instructions and/or other type of code may be loaded onto a computer, processor or other programmable apparatuses circuitry to produce a machine, such that the computer, processor or other programmable circuitry that executes the code may be the means for implementing various functions, including those described herein. As indicated herein, program code instructions may be stored in memory, and executed by a processor, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Referring now to FIG. 2, there is illustrated a diagram depicting an exemplary vehicle engagement system 201 in which concepts consistent with the present disclosure may be implemented. Examples of each element within the vehicle engagement system 201 of FIG. 2 are broadly described above with respect to FIG. 1. In particular, the server system 260 and user system 220 have attributes similar to computer system 10 of FIG. 1 and illustrate one possible implementation of computer system 10. Vehicle engagement system 201 preferably includes one or more user systems 220, 222, 224 (e.g., a first computing device, a second computing device, a third computing device, etc.), one or more server system 260, and network 250, which could be, for example, the Internet, public network, private network or cloud. User systems 220-224 each preferably include a computer-readable medium, such as random access memory, coupled to a processor. The processor, CPU 102, executes program instructions or operations stored in memory. Vehicle engagement system 201 typically includes one or more user system 220. For example, user system 220 may include one or more general-purpose computers (e.g., personal computers), one or more special purpose computers (e.g., devices specifically programmed to communicate with each other and/or the server system 260), a workstation, a server, a device, a digital assistant or a "smart" cellular telephone or pager, a digital camera, a component, other equipment, or some combination of these elements that is capable of responding to and executing instructions or operations.

Similar to user system 220, server system 260 preferably includes a computer-readable medium, such as random access memory, coupled to a processor. The processor executes program instructions stored in memory. Server system 260 may also include a number of additional external or internal devices, such as, without limitation, a mouse, a CD-ROM, a keyboard, a display, a storage device and other attributes similar to computer system 10 of FIG. 1. Server system 260 may additionally include a secondary storage element, such as database 270 for storage of data and information. Server system 260, although depicted as a single computer system, may be implemented as a network of computer processors. Memory in server system 260 contains one or more executable steps, program(s), algorithm(s), or application(s) 206 (shown in FIG. 1). For example, the server system 260 may include a web server, information server, application server, one or more general-purpose computers (e.g., devices specifically programmed to communicate with each other), a workstation or other equipment, or some combination of these elements that is capable of responding to and executing instructions or operations.

The vehicle engagement system 201 is capable of delivering and exchanging data between user system 220 and a server system 260 through communications link 240 and/or network 250. Through user system 220, users can preferably communicate over network 250 with each other user system 220, 222, 224, and with other systems and devices, such as server system 260, to electronically transmit, store, manipulate, and/or otherwise use data exchanged between the user system and the server system. Communications link 240 typically includes network 250 making a direct or indirect communication between the user system 220 and the server system 260, irrespective of physical separation. Examples of a network 250 include the Internet, cloud, analog or digital wired and wireless networks, radio, television, cable, satellite, and/or any other delivery mechanism for carrying and/or transmitting data or other information, such as to electronically transmit, store, manipulate, and/or otherwise modify data exchanged between the user system and the server system. The communications link 240 may include, for example, a wired, wireless, cable, optical or satellite communication system or other pathway. It is contemplated herein that RAM 104, main storage device 214, and database 270 may be referred to herein as storage device(s) or memory device(s).

Referring to FIG. 3, a vehicle engagement system 300 may further include any one of a first computing device 310, a second computing device 320, a third computing device 330, a fourth computing device 340, a fifth computing device 350, and a sixth computing device 360, as described herein above with respect to FIG. 1. For example, a first computing device 310 may be operably engaged with a first vehicle 311. According to one aspect, the first computing device 310 may be operably engaged with an ignition system of the first vehicle 311. In another aspect, a second computing device may be operably engaged with the first vehicle 311 and/or another vehicle. In particular, the second computing device 320 may be configured to operably engage a battery system of the first vehicle 311 and/or another vehicle. In some aspects, the third computing device 330 may be configured to operably engage the first vehicle 311 and/or another vehicle. For example, the third computing device 330 may be configured to operably engage an electrical load of an electrical system of the first vehicle 311 and/or another vehicle. In some aspects, the third computing device 330 may be configured to operably engage a load control slave module 321 of an electrical system of a first vehicle 311 and/or another vehicle.

The first, second, and third computing devices 310, 320, 330 may be configured to operably engage a vehicle system using close proximity wireless communication protocols, such as Bluetooth, NFC, and/or the like. For example, the first, second and/or third computing devices 310, 320, 330 may be configured to wirelessly communicate with a fourth computing device 340. The fourth computing device 340 may be configured to operably engage any one of the first, second, and/or third computing devices 310, 320, 330 using a close proximity wireless communication protocol. Additionally, the fourth computing device 340 may be configured to electronically communicate and/or be operably engaged with the fifth computing device 350 using a network communication protocol (e.g., the Internet) via a network 301. Likewise, the fourth and fifth computing devices 340, 350 may be configured to electronically communicate and/or be operably engaged with a sixth computing device 360 using a network communication protocol (e.g., the Internet) via the network 301.

In some aspects, the first computing device 310, such as a computing device described in FIG. 1 and/or the like, may include a first display that is configured to provide at least one indicia. The indicia may be configured to provide an indication of whether the vehicle is configured to move forward, is in a neutral configuration, and/or configured to move backwards. According to some aspects, the first computing device 310 may further include a keypad, as described with respect to the computing device in FIG. 1, configured to receive a user input corresponding to an authentication code for enabling control of a vehicle engagement system. Likewise, the second and third computing devices 320, 330 may include a similar keypad and/or the like configured to receive a user input corresponding to an authentication code for enabling control of a battery and/or an electrical load of an electrical system of an associated vehicle.

Additionally or alternatively, the first, second, and/or third computing devices may further include a global positioning system (GPS) communication system configured to determine the location of the first, second, and/or third computing devices and a vehicle associated with any of the computing devices. Further, any of the first, second, and/or third computing devices 310, 320, 330 may further include an alarm module configured to provide a visual and/or audio alarm when the first, second, and/or third computing devices 310, 320, 330 are tampered, altered, and/or otherwise manipulated in an unauthorized fashion. According to some aspects, the first, second, and/or third computing devices may further include a USB input/output configured to electrically charge the first, second, and/or third computing devices respectively.

In some aspects of the present disclosure, the first and/or second computing devices may further include at least one electrical connector configured to operably engage a corresponding electrical connector of a vehicle associated with the first and/or second computing device. For example, the first and second computing devices may further include a power-in electrical connector, a power-out electrical connector, and a ground connector configured to operably engage an electrical circuit associated with at least one vehicle system and/or battery associated with a vehicle that is associated with the first and/or second computing device. For example, the first computing device 310 may be electrically connected and operably engaged with a vehicle ignition system so as to provide for remote operation and/or control of the vehicle ignition system. The first computing device 310 may include an electrical switch configured to complete an electrical circuit so as to control and/or remotely engage a vehicle ignition system, such as the vehicle ignition system of a first vehicle 311. According to some aspects, the first computing device 310 may be configured to receive an engagement sequence so as to complete the electrical circuit thereby controlling the vehicle ignition system and/or providing for the remote ignition of the associated vehicle (e.g., the first vehicle).

According to another aspect of the present disclosure, the second computing device 320 may further include at least one electrical connector configured to operably engage a battery, an electrical storage system, and/or the like of a vehicle associated with the second computing device 320. In some aspects, the second computing device 320 may be associated with the first vehicle 311. According to another aspect, the second computing device 320 may be associated with another vehicle.

The second computing device 320 may further include a display configured to provide at least one indicia. In some aspects, the indicia may correspond to at least one of a battery status, such as, for example, a battery purchase and/or installation date, a total battery usage time interval, a number of battery charge/discharge cycles, and/or an overall battery health status. According to some aspects, the second computing device 320 may be configured to transmit data associated with at least one battery status to another computing device, such as, for example, a fourth, fifth, and/or sixth computing device 340, 350, 360.

As stated herein, the third computing device 330 may be configured to control an electrical load of an electrical system of a vehicle associated with the third computing device 330. In some aspects, the third computing device 330 may be configured to control an electrical load of a system of the first vehicle 311. For example, the third computing device 330 may be configured to electrically communicate with a load control slave module 321 that is operably engaged with an electrical system of the associated vehicle. The load control slave module 321 and the third computing device 330 may be configured to electrically communicate with one another using a near proximity wireless communication protocol, such as Bluetooth and/or the like. The load control slave module 321 may be electrically connected with a power source, such as a battery, and may be configured to modulate and/or provide a desired electrical output to a desired electrical system of the associated vehicle when the third computing device 330 is operably engaged with the load control slave module 321. The third computing device 330 may be configured to transmit a signal to the load control slave module 321 so as to provide the desired electrical output to the specific electrical system of the associated vehicle. For example, the third computing device 330 may be configured to transmit a signal to the load control slave module 321 so as to receive an electrical load input of approximately between 36 and 48 volts and provide an electrical load output of approximately 12 volts. The load control slave module 321 may be configured to provide the desired electrical load output to an electrical system (e.g., air-conditioner, fans, lights, heater elements, and/or the like) of the associated vehicle.

As previously stated herein, the fourth computing device 340 may be configured to transmit and/or receive data associated with any of the first, second, and/or third computing devices 310, 320, 330. Additionally, the fifth and/or sixth computing devices 350, 360 may also be configured to transmit and/or receive data associated with any of the first, second, and/or third computing devices 310, 320, 330. For example, the fourth computing device 340 may include any suitable computing device, such as, for example, a smartphone, tablet, laptop, desktop and/or the like configured to control any one of the first, second, and/or third computing devices 310, 320, 330.

Further, any of the first, second, third, and/or fourth computing devices 310, 320, 330, 340 may be configured to receive user characteristic data associated with a specific user of the vehicle engagement system. For example, the fourth, fifth, and/or sixth computing device 340, 350, 360 may be configured to receive user characteristic data associated with the user, such as an authorization level of the user, vehicle usage history associated with the user, current and/or past vehicle location status(es) associated with a vehicle currently associated with the user, vehicle status of a vehicle currently associated with the user, and/or the like. Additionally and/or alternatively, the fourth computing device 340 may be configured to transmit an activation signal to any one of the first, second, and/or third computing devices 310, 320, 330 so as to provide for the operable engagement of the first, second, and/or third computing device with a vehicle associated with any one of the first, second and/or third computing devices. In some aspects, the sixth computing device 360 may be configured to store user characteristic data, vehicle characteristic data, and/or data associated with the computing device operably engaged with the vehicle. That is, the sixth computing device 360 may be configured to provide for fleet management services to a plurality of vehicles by electronically communicating with any one of the first, second, third, fourth, and/or fifth computing devices.

Aspects of the present disclosure also provide for a method of using a vehicle engagement system, as described herein. Referring to FIG. 4, a method 400 may include receiving an authorization code on at least a fourth computing device 401. Additionally or alternatively, the first, second, and/or third computing device may be configured to transmit and/or receive an electrical signal corresponding to the authorization code with the fourth computing device. The method 400 may include providing an authorization code 402 to any one of the first, second, and/or third computing devices. In some aspects, the fourth computing device may be configured to provide the authorization code to any one of the first, second, and/or third computing devices. According to another aspect, a user may provide the authorization code to any one of the first, second, and/or third computing device via an input device of the first, second, and/or third computing device.

The method 400 may further include verifying the authorization code 404 provided to the specific computing device. In some aspects, the first, second, and/or third computing device may electronically communicate with any one of the fourth, fifth, and/or sixth computing device to verify the authorization code is valid. Additionally, any one of the fourth, fifth, and/or sixth computing device may be configured to transmit a signal to the first, second, and/or third computing device that includes data corresponding to a validation of the specific authorization code.

The method 400 may further include enabling control of a vehicle system 406 corresponding to the first, second, and/or third computing device upon validation of the specific authorization code. For example, if a user has provided a valid authorization code, the first computing device 310 may be configured to engage a vehicle ignition system so as to allow for the user to control the vehicle movement. In another aspect, the second computing device 320 may be configured to engage a battery and/or power source so as to allow for the user to control (e.g., turn on/off) access to a battery and/or a power source of a vehicle associated with the second computing device 320. According to another aspect, the third computing device 330 may be configured to engage a load control slave module 321 so as to allow for the user to control (e.g., provide a particular electrical load) an electrical system of a vehicle associated with the third computing device 330. Additionally or alternatively, enabling control of a vehicle system 406 may further include enabling a user to provide input to the first, second, and/or third computing device so as to control various vehicle systems corresponding to the first, second, and/or third computing device.

In some aspects, the method 400 may further include performing fleet management services 408 for a vehicle operably engaged with any one of the first, second, third, fourth, fifth, and/or sixth computing devices. For example, the system may be configured to monitor a vehicle's location using a global positioning system, multilateration of radio signals, and/or the like. In some aspects, the system may be configured to track, record, and/or monitor vehicle usage, vehicle systems usage, battery health, battery status, load control status, and/or the like features of the vehicle using any one of the first, second, and/or third computing devices operably engaged with the vehicle. Further, the system may be configured to allow for particular user access to a vehicle using any one of the first, second, and/or third computing devices associated with the vehicle. For example, a user with a fourth computing device may approach a vehicle operably engaged with a first computing device. The fourth computing device may be configured to electronically communicate with the first computing device when a proper authentication has been verified by the first computing device, thereby allowing the user to start an ignition system of the vehicle and/or other systems of the vehicle. The system may be further configured to track and monitor a plurality of vehicles, each vehicle being associated with a computing device configured to provide for remote vehicle engagement.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for keyless activation, engagement, and monitoring of vehicles, said method comprising:
   connecting a first computing device having a first processor, a first keypad, a first display and a first data store to an ignition system of a vehicle and configuring said first computing device to receive and process an at least one vehicle data associated with an activation and engagement sequence of said vehicle;
   connecting a second computing device having a second processor and a second data store to a battery system of said vehicle and configuring said second computing device to receive and process an on-off control and activation of said battery system;
   connecting a third computing device having a third processor and a third data store to an at least one load control slave module of said vehicle, said at least one load control slave module being capable of modulating a voltage output to an electronically controlled device of said vehicle, and configuring said third computing device to receive and process an on-off control and activation of said at least one load control slave module; and
   configuring a fourth computing device having a fourth processor, a fourth display, and a fourth data store with an application to transmit an activation and engagement sequence in accordance with said vehicle's ignition system and said on-off controls and activations via a close proximity wireless communication thereto said first computing device, said second computing device, and said third computing device;
   thereby allowing a user to activate, engage, and monitor said vehicle via close proximity communication between said fourth computing device and said first computing device, said second computing device and said third computing device.

2. The method of claim 1, further comprising configuring a fifth computing device having a fifth processor, a fifth display, and a fifth data store to receive and communicate said activation and engagement sequence in accordance with said vehicle's ignition system and said on-off controls and activations, therewith said fourth computing device via distant wireless communication and an Internet.

3. The method of claim 2, further comprising configuring a sixth computing device having a sixth processor, a sixth display, and a sixth data store, said sixth processor to generate and communicate said activation and engagement sequence in accordance with said vehicle's ignition system and said on-off controls and activations, therewith said fourth computing device via distant wireless communication and the Internet, therewith said fifth computing device via distant wireless communication and the Internet.

4. The method of claim 1, further comprising configuring said first display to provide a forward indicator and a reverse indicator and configuring said first computing device to communicate with said second and said third computing device via close proximity wireless communication.

5. The method of claim 1, further comprising configuring said close proximity wireless communication via at least an at least one close proximity wireless communication technology from a group of communication technologies comprising a Bluetooth connection, a Wi-Fi connection, and an RF Mesh connection.

6. The method of claim 1, further comprising configuring a computing device from a group of computing devices comprising said first computing device, said second computing device, and said third computing device with a GPS capability.

7. The method of claim 1, further comprising including on a computing device from a group of computing devices comprising said first computing device, said second computing device, and said third computing device, a security alarm.

8. The method of claim 1, further comprising including on a computing device from a group of computing devices comprising said first computing device, said second computing device, and said third computing device, a USB charger wherein said computing device may be charged via USB.

9. The method of claim 1, further comprising including a battery indicator on said second computing device includes, the battery indicator being associated with a battery status.

10. The method of claim 3, further comprising configuring an at least one computing device from a group of computing devices comprising said first computing device, said second computing device, and said third computing device to receive an authorization code.

11. The method of claim 10, further comprising configuring said at least one computing device to verify the authorization code via at least one of said fourth computing device, said fifth computing device and said sixth computing device.

12. The method of claim 11, further comprising approaching said vehicle with said forth computing device, activating said application on said forth computing device, operably engaging said forth computing device with said first computing device, electronically communicating between said first and said forth computing device to authenticate and start said vehicle, and engaging a group of other systems in said vehicle via communication between said first computing device and said second and said third computing devices.

13. A system for keyless activation, engagement, and monitoring of vehicles and mobile app system, said system comprising:
   a first computing device having a first processor, a first keypad, a first display and a first data store, said first computing device configured to receive and process at least one vehicle data associated with a first vehicle via a close proximity wireless communication;

a second computing device having a second processor and a second data store, said second processor configured to receive and process an on-off control and activation of the battery systems and transmit a battery status via said close proximity wireless communication;

a third computing device having a third processor and a third data store, said third processor configured to receive and process an on-off control and activation of a load control slave module capable of modulating a voltage output to an electronically controlled device via said close proximity wireless communication; and a fourth computing device having a fourth processor, a fourth display, and a fourth data store, said fourth processor configured with an application to transmit an activation and engagement sequence in accordance with said vehicle's ignition system and said on-off controls and activations via said close proximity wireless communication thereto said first computing device, said second computing device, and said third computing device;

thereby allowing a user to activate, engage, and monitor said vehicle via close proximity communication between said fourth computing device and said first computing device, said second computing device and said third computing device.

14. The system of claim 13, further comprising a fifth computing device having a fifth processor and a fifth data store, said fifth processor configured to receive and communicate said activation and engagement sequence in accordance with said vehicle's ignition system and said on-off controls and activations, therewith said fourth computing device via distant wireless communication and the Internet.

15. The system of claim 14, further comprising a sixth computing device having a sixth processor and a sixth data store, said sixth processor configured to generate and communicate said activation and engagement sequence in accordance with said vehicle's ignition system and said on-off controls and activations, therewith said fourth computing device via distant wireless communication and the Internet, therewith said fifth computing device via distant wireless communication and the Internet.

16. The system of claim 13, wherein said first display is configured to provide a forward indicator and a reverse indicator and said first computing device is configured to communicate with said second and said third computing device via close proximity wireless communication.

17. The system of claim 13, wherein said close proximity wireless communication is configured via at least an at least one close proximity wireless communication technology from a group of communication technologies comprising a Bluetooth connection, a Wi-Fi connection, and an RF Mesh connection.

18. The system of claim 13, wherein a computing device from a group of computing devices comprising said first computing device, said second computing device, and said third computing device is configured with a GPS capability.

19. The system of claim 13, wherein a computing device from a group of computing devices comprising said first computing device, said second computing device, and said third computing device is configured to receive and verify an authorization code from at least one of said fourth computing device, said fifth computing device and said sixth computing device.

20. The system of claim 19, wherein said forth computing device is configured to, when within range of said vehicle, activate said application on said forth computing device, operably engage said forth computing device with said first computing device, electronically communicate between said first and said forth computing device to authenticate and start said vehicle, and engage a group of other systems in said vehicle via communication between said first computing device and said second and said third computing devices.

* * * * *